(12) United States Patent
Kalinichenko et al.

(10) Patent No.: US 8,738,527 B2
(45) Date of Patent: May 27, 2014

(54) ESTABLISHING A FINANCIAL ACCOUNT USING A MOBILE COMPUTING DEVICE

(75) Inventors: Boris Olegovich Kalinichenko, Jamaica Plain, MA (US); Joseph G. Ferra, Dover, MA (US)

(73) Assignee: FMR LLC, Boston, MA (US)

( * ) Notice: Subject to any disclaimer, the term of this patent is extended or adjusted under 35 U.S.C. 154(b) by 52 days.

(21) Appl. No.: 13/467,815

(22) Filed: May 9, 2012

(65) Prior Publication Data

US 2013/0304644 A1 Nov. 14, 2013

(51) Int. Cl.
*G06Q 40/00* (2012.01)

(52) U.S. Cl.
USPC .................. 705/42; 705/35; 705/40; 705/44

(58) Field of Classification Search
USPC .......................................... 705/35, 40, 42, 44
See application file for complete search history.

(56) References Cited

U.S. PATENT DOCUMENTS

| | | | |
|---|---|---|---|
| 7,818,215 B2 * | 10/2010 | King et al. | .................... 705/26.1 |
| 2004/0049401 A1 * | 3/2004 | Carr et al. | .......................... 705/1 |
| 2006/0061806 A1 | 3/2006 | King et al. | |
| 2006/0206724 A1 | 9/2006 | Schaufele et al. | |
| 2008/0044077 A1 | 2/2008 | Mennie et al. | |
| 2009/0185241 A1 * | 7/2009 | Nepomniachtchi | .......... 358/474 |
| 2010/0011428 A1 | 1/2010 | Atwood et al. | |
| 2010/0088338 A1 | 4/2010 | Pavoni, Jr. et al. | |
| 2010/0182647 A1 | 7/2010 | Lapstun et al. | |
| 2013/0033522 A1 | 2/2013 | Calman et al. | |

OTHER PUBLICATIONS

Yang, S. Z. (2002). China's economic transition, 1978-2000: An alternative institutional analysis. (Order No. 3072729, The University of Wisconsin—Madison). ProQuest Dissertations and Theses, pp. 1-156.*

Cadogan, R. A. (2002). The ethics of data privacy in an electronic marketplace: A multiple case study of the privacy policy notice and the incorporation of fair information practice principles. (Order No. 3037362, Capella University). ProQuest Dissertations and Theses, , 392-392 p.*

Korzyk,Alexander Dennis,,Sr. (2002). A conceptual design model for integrative information system security. (Order No. 3066666, Virginia Commonwealth University). ProQuest Dissertations and Theses, , 224-224 p.*

"DBBL Mobile Banking at a Glance, Banking for the unbanked," brochure, Dutch-Bangla Bank Limited, 7 pages.

International Search Report for International Application No. PCT/US2013/34120, Date of Mailing Jun. 13, 2013, including Written Opinion of the International Search Authority (8 pages total).

* cited by examiner

*Primary Examiner* — Muriel Tinkler
(74) *Attorney, Agent, or Firm* — Proskauer Rose LLP

(57) ABSTRACT

A financial account is established using a mobile computing device. A digital image of an applicant's identification having text based components is captured. The digital image of the identification is processed to recognize at least a portion of the text based components. The portion of the text based components is used to complete an application for the financial account. The digital image of the identification is transmitted to a regulatory body. Verification of the identity of the applicant is received from the regulatory body. The financial account for the applicant is established.

17 Claims, 5 Drawing Sheets

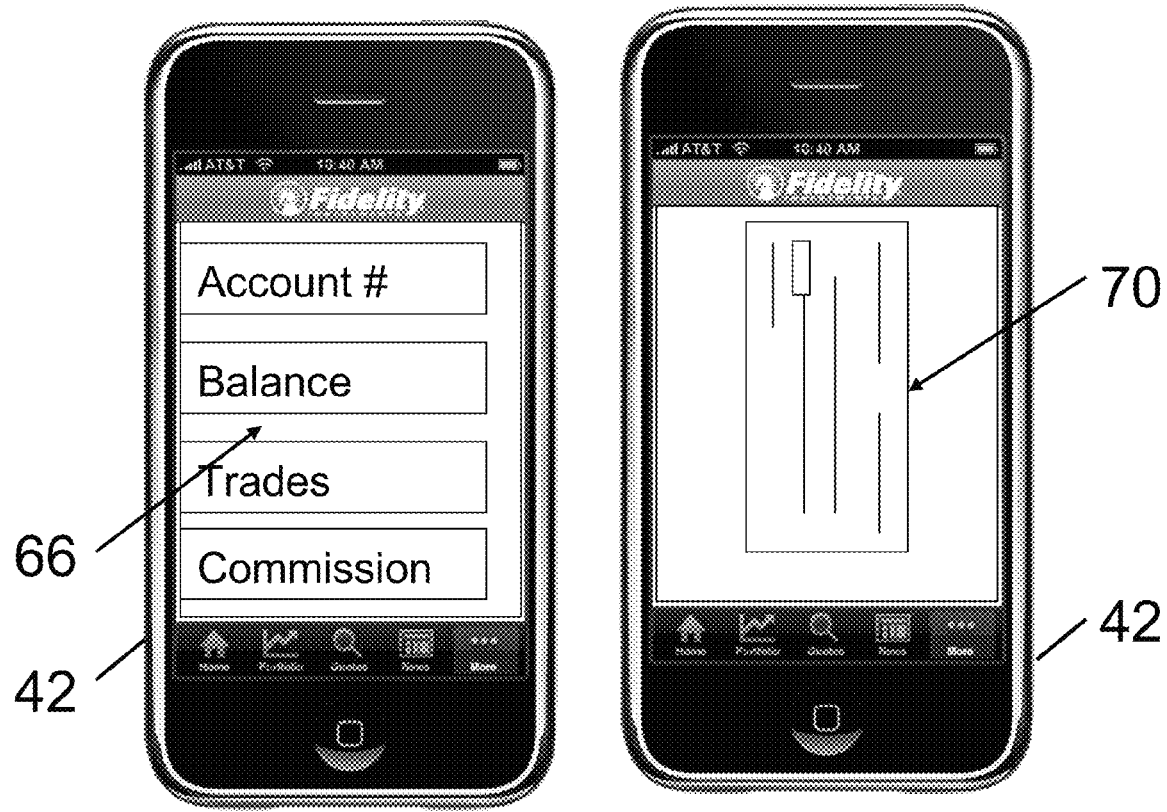

ESTABLISHING A FINANCIAL ACCOUNT USING A MOBILE COMPUTING DEVICE

FIELD OF THE INVENTION

The invention relates generally to methods and systems, including computer program products, for opening or establishing a financial account (e.g., a brokerage account or a retirement account) using a mobile computing device.

BACKGROUND

When financial services representatives interact with customers or potential customers in a face-to-face manner, such as during meetings or at trade shows, a representative can convince a customer to open a particular type of account with the financial services company. Currently, the process requires filling out paperwork and delivering the paperwork to the account opening specialists at the financial services company. Paperwork is time consuming and sometimes discourages the customer from acting on the spot, particularly in a trade show environment, where the customer is trying to meet as many vendors as possible.

SUMMARY OF THE INVENTION

The invention, in various embodiments, features a system and process for opening or establishing a financial account (e.g., a brokerage account or a retirement account) using a mobile computing device. A financial services representative can expedite the process of account opening by capturing the information needed to establish the account using the mobile device. Furthermore, the mobile device can be used to fund an account and provide the customer subsequent access to the account, thereby eliminating or alleviating the lengthy process typically required. The invention can be employed in meetings with financial services providers, such as advisors, or at trade shows.

In one aspect, there is a method of establishing a financial account using a mobile computing device. The method includes capturing, by the mobile computing device, a digital image of an applicant's identification having text based components; processing, by the mobile computing device, the digital image of the identification to recognize at least a portion of the text based components; using, by the mobile computing device, the portion of the text based components to complete an application for the financial account; transmitting, by the mobile computing device, the digital image of the identification to a regulatory body; receiving from the regulatory body, by the mobile computing device, verification of the identity of the applicant; and establishing, by the mobile computing device, the financial account for the applicant.

In another aspect, there is a computer program product, tangibly embodied in a machine readable storage device, for establishing a financial account using a mobile computing device. The computer program product includes instructions being operable to cause a data processing apparatus to capture a digital image of an applicant's identification having text based components, process the digital image of the identification to recognize at least a portion of the text based components, use the portion of the text based components to complete an application for the financial account, transmit the digital image of the identification to a regulatory body, receive from the regulatory body verification of the identity of the applicant, and establish the financial account for the applicant.

In still another aspect, there is a system for establishing a financial account using a mobile computing device. The system includes a financial account opening module configured to capture a digital image of an applicant's identification having text based components, process the digital image of the identification to recognize at least a portion of the text based components, use the portion of the text based components to complete an application for the financial account, transmit the digital image of the identification to a regulatory body, receive from the regulatory body verification of the identity of the applicant, and establish the financial account for the applicant.

In yet another aspect, there is a mobile computing device for establishing a financial account. The apparatus includes means for capturing a digital image of an applicant's identification having text based components, means for processing the digital image of the identification to recognize at least a portion of the text based components, means for using the portion of the text based components to complete an application for the financial account, means for transmitting the digital image of the identification to a regulatory body, means for receiving from the regulatory body verification of the identity of the applicant, and means for establishing the financial account for the applicant.

In other examples, any of the aspects above, or any apparatus, system or device, or method, process or technique, described herein, can include one or more of the following features.

The financial account can be a brokerage account or a retirement savings account. The applicant's identification can be a driver's license and the regulatory body can be a state-run department of motor vehicles. In certain embodiments, an account number is assigned to the financial account.

In certain embodiments, a second digital image of a payment instrument is captured to access funds for the financial account so that the funds can be transferred to the financial account. An interface for the applicant to access the financial account can be provided. The interface can be on a display of the mobile computing device.

In various embodiments, an interface is provided for receipt of applicant information not contained by the identification. Once received, the applicant information is used to complete the application for the financial account. An interface for the applicant to access the financial account can be provided on the applicant's mobile device.

In various embodiments, a third digital image of account augmentation information is captured, and the account augmentation information is applied to the financial account.

In some embodiments, a fourth digital image of a promotional display for the financial account can be captured to initiate establishing the financial account. In some embodiments, an indicator to initiate establishing the financial account is received on a touch screen display or a keypad.

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1:
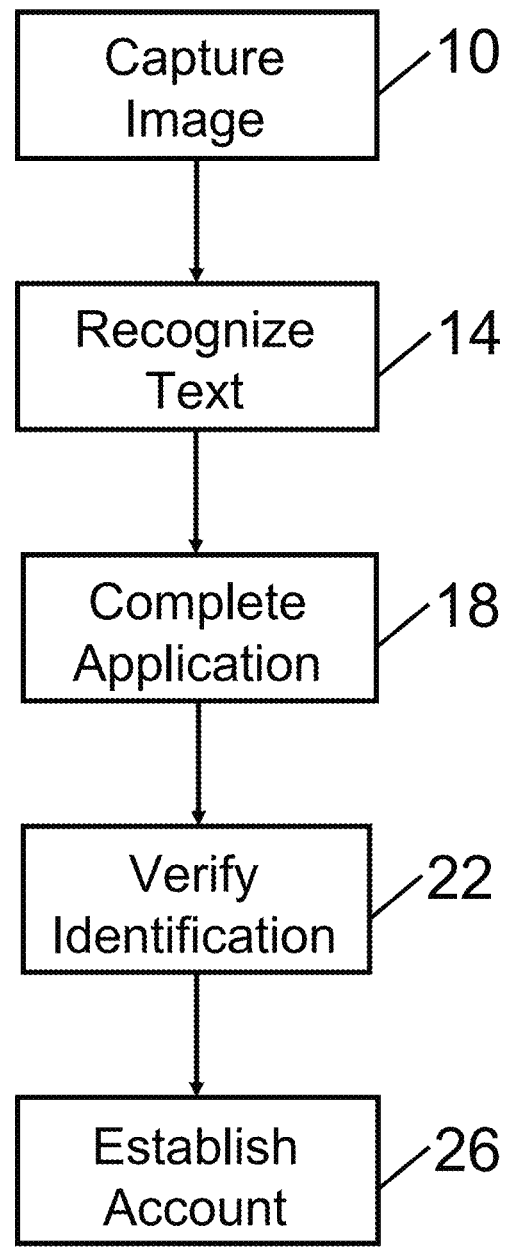
FIG. 1 is a flow diagram showing a computer implemented process establishing a financial account using a mobile computing device.

FIG. 1 is a flow diagram showing a computer implemented process for establishing a financial account using a mobile computing device. A digital image of an applicant's identification having text based components is captured using a mobile computing device (10). The digital image of the identification is processed by the computing device to recognize at least a portion of the text based components (14). The portion of the text based components is used to complete an application for the financial account (18). The digital image of the identification is transmitted to a regulatory body, where the identity of the applicant is verified (22). The mobile computing device is used to establish the financial account for the applicant (26). An account number can be assigned to the financial account. In various embodiments, an interface is provided by the mobile computing device for receipt of applicant information not contained by the identification. Once received, the applicant information is used to complete the application for the financial account so that the account can be established.

Figure 2:
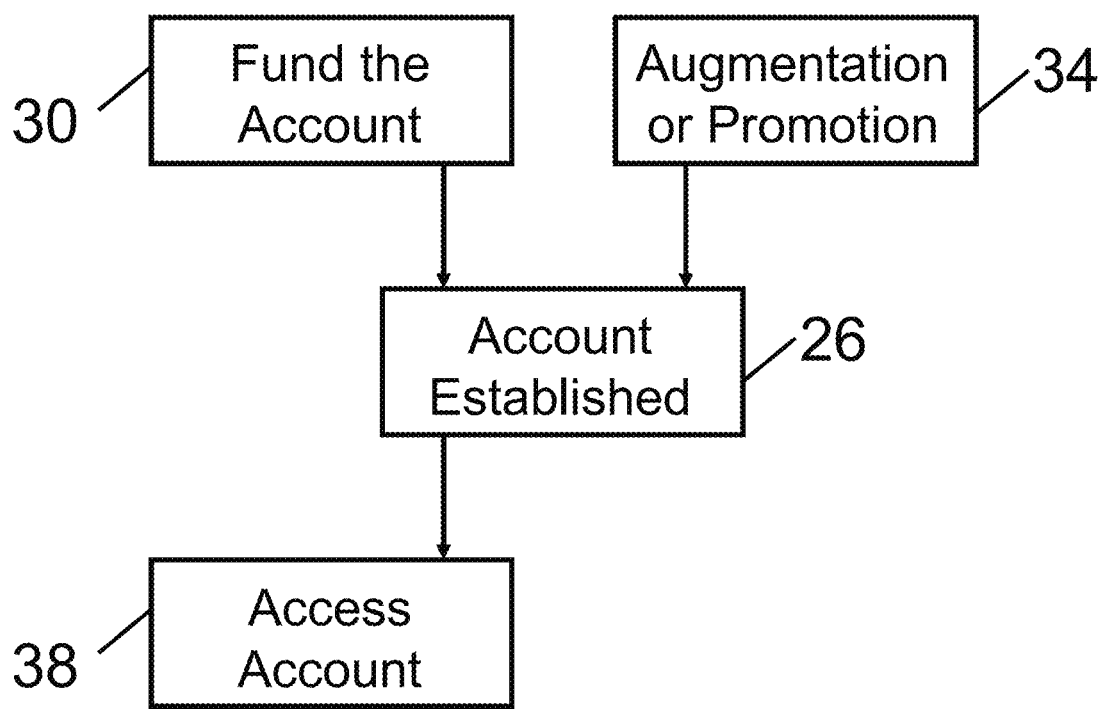
FIG. 2 is a flow diagram showing additional features or functions that can be employed once an account is established.

FIG. 2 is a flow diagram showing additional features or functions that can be employed once an account is established (26). The financial account can be funded (30). For example, a second digital image of a payment instrument (e.g., a check, credit card, debit card, or cash) can be captured using the mobile computing device. The payment instrument can allow funds to be accessed and transferred to the financial account.

The financial services company can provide an incentive to a prospective applicant if he/she opens an account. For example, a promotion or benefit, such as a cash credit or X number of free trades can be offered. If an incentive is being offered and an account is established, the augmentation, promotion or benefit is applied to the account (34). In certain embodiments, a third digital image of account augmentation information is captured by the mobile computing device, and the account augmentation information is applied to the financial account. The account augmentation information can be a display, a card, a banner, a voucher, a digital image of a promotion, or the like.

Once the account is established, the applicant can be provided access to the account (38). For example, an interface for the applicant to access the financial account can be provided on or by the mobile computing device. In certain embodiments, the interface is provided on the applicant's mobile device. The interface can be transmitted to the applicant's mobile device by a server associated with the mobile computing device.

To initiate an account opening, a financial services representative or advisor can open an application on the mobile computing device. For example, an indicator to initiate establishing the financial account can be received on a touch screen display or a keypad. In some embodiments, to initiate an account opening, a digital image of a promotional display (e.g., on a billboard or on a local display at a trade show) can be captured.

The mobile computing device can be a cell phone, a smart phone, a personal digital assistant device, or a tablet. In certain embodiments, the mobile computing device is a Blackberry, an iPhone, an IPad, or an Android device.

The mobile computing device can be configured with an imager such as a camera or scanner to capture one or more digital images of the identification, the payment instrument, a promotion, a benefit or account augmentation information.

The applicant's identification can be a government issued identification document, such as a driver's license or a passport. Text based components of the identification can include a name, address, social security number, document number (e.g., driver's license number), date of birth, date of expiration of document, sex, height, or weight of the applicant. Other components of the identification, which can be captured, include a picture, a signature, a front of the identification, a back of the identification, and a watermark or verification symbol of the identification.

The regulatory body can be a state-run department of motor vehicles or a Federal agency. The regulatory agency verifies identity by comparing data received from the account opening process against data stored in regulatory agency's database or by following any other existing process in place.

The financial account can be a brokerage account, a retirement savings account or a charitable giving account.

Figures 3A, 3B:
FIG. 3 shows workflow using a mobile computing device to establish a financial account.
Figures 3C, 3D:
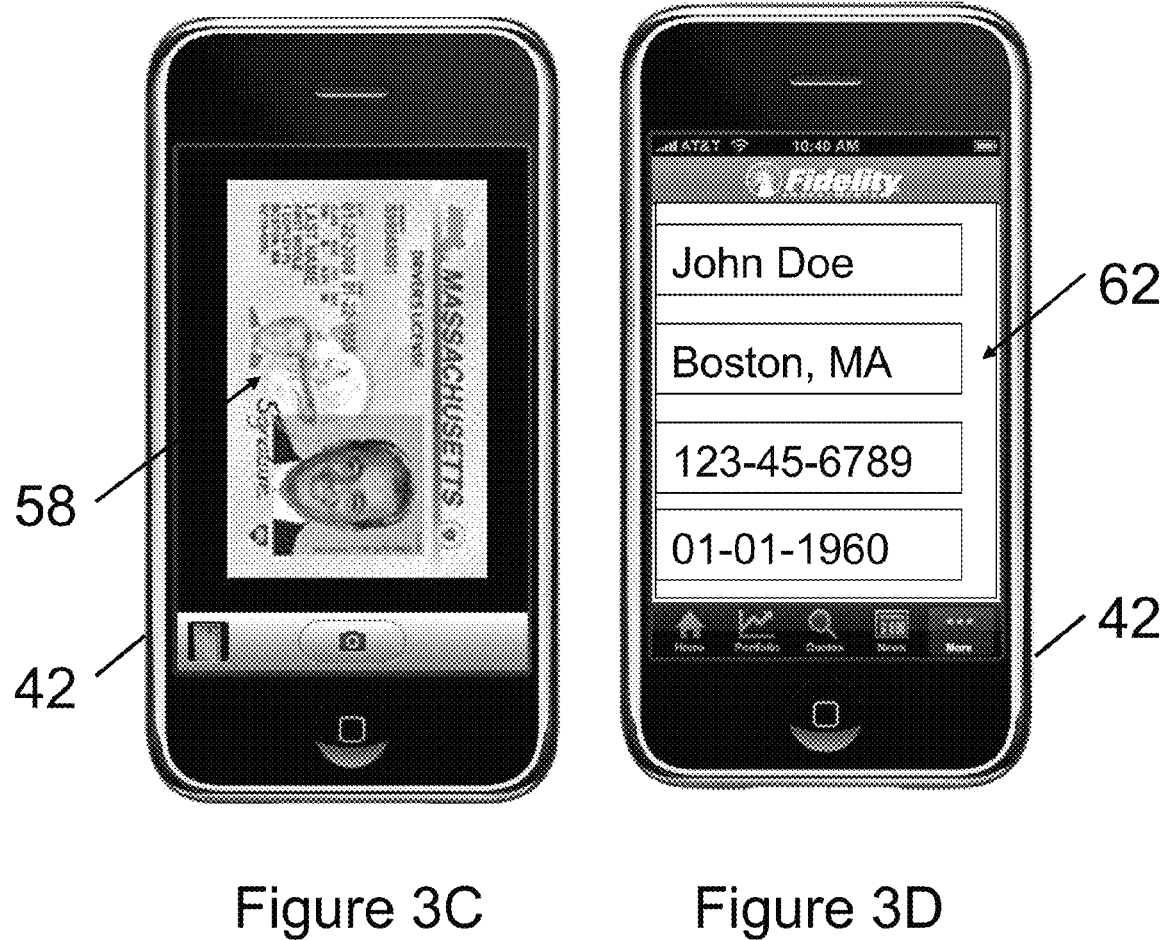

FIG. 3 shows workflow using a mobile computing device 42 to establish an account. In FIG. 3A, the mobile computing device 42 can present a software application 46 including an option 50 to open an account using a mobile application. In one example, a financial services representative can select the option 50 on the mobile computing device 42 to initiate opening an account. FIG. 3B shows a form 54 to be filled out by the applicant. The mobile computing device 42 can be used to image identification of the applicant to complete the form. FIG. 3C shows an image 58 of a driver's license taken by the mobile computing device 42. Both sides of the identification can be photographed by the financial services representative. The images of the identification can be stored locally on the mobile computing device 42 and/or can be stored on a server of the financial services representative.

The mobile computing device 42 or the server can parse the digital image to extract the information necessary to apply for an account, such as name of the customer, ID number, address of the customer, customer's date of birth and customers signature. FIG. 3D shows a form 62 including representative information. The information can be verified or validated by a government agency, such as a department of motor vehicles. A request to validate the identification can be sent from the mobile computing device 42 and/or the server.

If the identification is confirmed to be a valid, a financial services representative can complete any remaining information for the applicant, including Social Security number, investment profile as provided by the applicant or as determined by the representative, level of access to certain investment vehicles such as trades and stock options.

After the information is completed, the financial account can be established by the financial services company. An account number can be assigned to the financial account. FIG. 3E shows an exemplary account page 66.

If an incentive is being offered, the financial services representative can, for example, scan a bar code indexed to a specific promotional benefit (e.g., free trades, favorable commission, cash award, etc.). The incentive can be assigned to the account.

The applicant can pair his device with the financial services representative's device (e.g., the mobile computing device 42). If such a pairing occurs, a login screen that has the account number prefilled is presented to the customer on his/her device. The customer can enter his Social Security Number or other appropriate log in information to access his/her account. The customer can establish a user name and a password for subsequent online access.

The customer can use a payment instrument to fund the account. FIG. 3F shows an image of a check taken by the mobile computing device 42. The mobile computing device 42 and/or the financial services company's server can be used to parse the image and access funds to be debited from the account of the payment instrument and credited to the financial account.

In another example, the financial services company can post a promotion or advertisement on a billboard, in a magazine, on a website, or during a commercial. The promotion or advertisement can be a bar code. The applicant can image the promotion or advertisement using his/her mobile computing device to initiate the account opening. The financial services company can transmit a software application to the mobile computing device, which can include a form to be completed by the applicant and instructions. The mobile computing device can be used to image identification of the applicant to complete the form. Both sides of the identification can be photographed by the applicant. The images of the identification can be stored locally on the mobile computing device 42 and/or can be stored on a server of the financial services representative.

The mobile computing device or the server can parse the digital image to extract the information necessary to apply for an account. The information can be verified or validated by a government agency. The information can be transmitted to the server of the financial services company, and then to the government agency.

If the identification is confirmed to be a valid, the applicant can complete any remaining information for the application, including Social Security number. An investment profile can be provided by the applicant, level of access to certain investment vehicles can be determined.

After the information is completed, the financial account can be established by the financial services company. An account number can be assigned to the financial account. If an incentive is being offered, the incentive can be assigned to the account.

A screen where the applicant can select a user name and a password for subsequent online access is presented. The account can be funded by a payment instrument, which the applicant can image using his/her mobile computing device.

The above-described systems and methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, tablet) with a world wide web browser (e.g., Microsoft® Internet Explorer® available from Microsoft Corporation, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of establishing a financial account using a mobile computing device, comprising:
    presenting, by a mobile computing device, through a user interface a fillable application form that receives an applicant's information used to prepare an application to open the financial account;
    capturing, by the mobile computing device, a digital image of an applicant's identification having text based components;
    processing, by the mobile computing device, the digital image of the identification to recognize at least a portion of the text based components;
    filling the application form, by the mobile computing device, at least in part with the recognized portion of the text based components to complete the application for the financial account;
    transmitting, by the mobile computing device, the digital image of the identification to a regulatory body;
    receiving from the regulatory body, by the mobile computing device, verification of the identity of the applicant;
    communicating, by the mobile computing device, the completed application form to a remote server providing financial services to establish the financial account for the applicant if the identity of the applicant is verified;
    presenting by the mobile computing device through the user interface account information, including an assigned account number, corresponding to the financial account established for the applicant;
    capturing, by the mobile computing device, a second digital image of a payment instrument providing funds for the financial account and
    communicating, by the mobile computing device, the second digital image to a remote server providing financial services, thereby transferring the funds to the financial account associated with the assigned account number.

2. The method of claim 1 wherein the interface is on a display of the mobile computing device.

3. The method of claim 1 further comprising:
    receiving, by the mobile computing device, through the user interface further input data corresponding to the applicant's information; and
    filling the application form, by the mobile computing device, with the recognized portion of the text based components and the further input data corresponding to the applicant's information to complete the application for the financial account.

4. The method of claim 1 further comprising:
    capturing, by the mobile computing device, a third digital image of account augmentation information; and
    communicating, by the mobile computing device, the third digital image to the remote server, thereby applying the account augmentation information to the financial account.

5. The method of claim 1 wherein the financial account is a brokerage account.

6. The method of claim 1 wherein the financial account is a retirement savings account.

7. The method of claim 1 wherein the applicant's identification is a driver's license and the regulatory body is a state-run department of motor vehicles.

8. The method of claim 1 further comprising:
    capturing, by the mobile computing device, a fourth digital image of a promotional display for the financial account to initiate establishing the financial account.

9. The method of claim 1 further comprising:
receiving, by the mobile computing device, on a touch screen display or a keypad, an indicator to initiate establishing the financial account.

10. A computer program product, tangibly embodied in a machine readable storage device, for establishing a financial account using a mobile computing device, the computer program product including instructions being operable to cause a data processing apparatus to:
present through a user interface a fillable application form that receives an applicant's information used to prepare an application to establish a financial account
capture a digital image of an applicant's identification having text based components;
process the digital image of the identification to recognize at least a portion of the text based components;
fill the application form at least in part with the recognized portion of the text based components to complete the application for the financial account;
transmit the digital image of the identification to a regulatory body;
receive from the regulatory body verification of the identity of the applicant;
communicate the completed application form to a remote server providing financial services to establish the financial account for the applicant if the identity of the applicant is verified;
present through the user interface account information, including an assigned account number, corresponding to the financial account established for the applicant;
capture a second digital image of a payment instrument providing funds for the financial account; and
communicate the second digital image to a remote server providing financial services, thereby transferring the funds to the financial account associated with the assigned account number.

11. The computer program product of claim 10 including further instructions being operable to cause the data processing apparatus to:
capture a third digital image of account augmentation information; and
apply the account augmentation information to the financial account.

12. The computer program product of claim 10 wherein the financial account is a brokerage account.

13. The computer program product of claim 10 wherein the financial account is a retirement savings account.

14. A computerized system for establishing a financial account using a mobile computing device, the system comprising:
a mobile computing device; and
a remote server providing financial services;
the mobile computing device having a processor executing a financial account opening module configured to:
present through a user interface a fillable application form that receives an applicant's information used to prepare an application to establish a financial account;
capture a digital image of an applicant's identification having text based components;
process the digital image of the identification to recognize at least a portion of the text based components;
fill the application form at least in part with the recognized portion of the text based components to complete the application for the financial account;
transmit the digital image of the identification to a regulatory body;
receive from the regulatory body verification of the identity of the applicant;
communicate the completed application form to the remote server providing financial services to establish the financial account for the applicant if the identity of the applicant is verified;
present through the user interface account information, including an assigned account number, corresponding to the financial account established for the applicant;
capture a second digital image of a payment instrument providing funds for the financial account; and
communicate the second digital image to a remote server providing financial services, thereby transferring the funds to the financial account associated with the assigned account number.

15. The system of claim 14 wherein the financial account opening module is further configured to:
capture a third digital image of account augmentation information; and
apply the account augmentation information to the financial account.

16. The system of claim 14 wherein the financial account is a brokerage account.

17. The system of claim 14 wherein the financial account is a retirement savings account.

* * * * *